United States Patent [19]

Stidham

[11] 3,885,100

[45] May 20, 1975

[54] SIX-PORT CONFERENCE AMPLIFIER CIRCUIT

[75] Inventor: James Richard Stidham, Broomfield, Colo.

[73] Assignee: Bell Telephone Laboratories, Incorporated, Murray Hill, N.J.

[22] Filed: May 31, 1974

[21] Appl. No.: 474,879

[52] U.S. Cl. .......................... 179/1 CN; 179/170 G

[51] Int. Cl. ......................... H04m 3/56; H04m 3/40

[58] Field of Search .......... 333/11, 80 T; 179/1 CN, 179/170 D, 170 G, 18 BC; 330/110; 329/203

[56] References Cited

UNITED STATES PATENTS

| | | | |
|---|---|---|---|
| 1,944,283 | 1/1934 | Strecker | 179/1 CN |
| 3,108,157 | 10/1963 | Feiner | 179/1 CN |
| 3,527,889 | 9/1970 | Nennerfelt | 179/1 CN |
| 3,767,861 | 10/1973 | Dimmer | 179/1 CN |
| 3,816,917 | 6/1974 | Jones et al. | 179/1 CN |
| 3,824,344 | 7/1974 | James et al. | 179/1 CN |

*Primary Examiner*—Thomas A. Robinson
*Attorney, Agent, or Firm*—John F. Moran

[57] ABSTRACT

Six transformer-coupled ports are connected in a hexagonal ring to form a telephone conference amplifier circuit. Adjacent pairs of ports are directly, as well as resistance, connected to form three balanced bridges. Each bridge has a differential amplifier which detects and amplifies signals originating in that bridge. The output of each differential amplifier drives the common node between the other two bridges, thus coupling a signal into the other ports of the conference amplifier. The new telephone conference amplifier circuit is a simple arrangement of inherent symmetry which offers a significant cost saving over conventional circuits.

6 Claims, 1 Drawing Figure

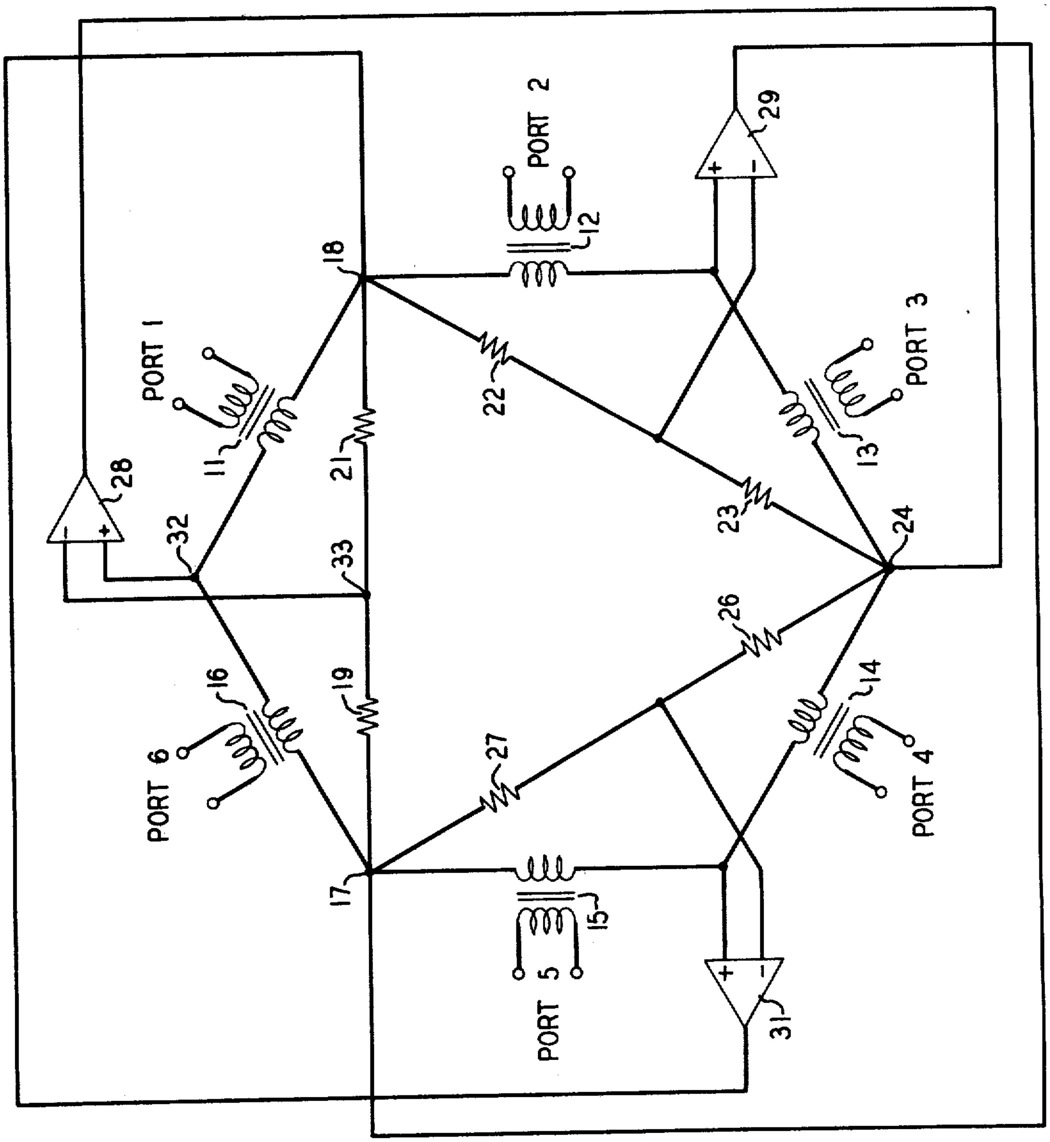
PORT 1
PORT 2
PORT 3
PORT 4
PORT 5
PORT 6
11
12
13
14
15
16
17
18
19
21
22
23
24
26
27
28
29
31
32
33
+
-

SIX-PORT CONFERENCE AMPLIFIER CIRCUIT

BACKGROUND OF THE INVENTION

This invention relates to telephone systems and, more particularly, to conference circuits which establish bilateral communication among a plurality of telephone subscriber lines.

A conference circuit which enables bilateral communication among three or more telephone subscriber lines generally imposes a number of requirements which are difficult to satisfy in the entirety. Reliable communication among all the telephone subscriber lines, or conferees, requires maintenance of adequate signal levels. Regenerative circulation of signals among the conferees must be prevented even though impedance imbalances may exist among the telephone subscriber lines. The performance of the conference circuit, as nearly as possible, should be independent of the number of telephone subscriber lines connected in the conference. Due to these onerous and seemingly conflicting requirements, conference calls have heretofore necessitated relatively delicate and complex arrangements which usually employ specially designed coupling networks and/or a large number of amplifiers.

A principal object of the invention is to provide a telephone conference amplifier circuit of increased reliability at a saving in cost.

It is a related object of the invention to permit a multiplicity of telephone lines in a common connection, such as a conference connection, so that the transmission characteristics are substantially the same as those of an ideal connection of only two lines.

SUMMARY OF THE INVENTION

The present invention amply satisfies all of the foregoing requirements of telephone conference circuits simultaneously and does it, moreover, with a minimum of expense and circuit complexity. Broadly, the invention permits a conference connection of six ports serially arranged in a hexagonal ring. Three pairs of resistors which have substantially equal resistance are each respectively connected with adjacent pairs of ports to form three balanced bridge circuits. Each bridge circuit includes a differential amplifier which detects and amplifies signals originating in that bridge. The output of each differential amplifier is applied to the common point between the other two bridges. thus coupling a signal from one port into the other ports of the conference amplifier circuit.

In an illustrative embodiment of the present invention, the secondaries of six transformer-coupled ports are serially connected in a hexagonal ring. Selected pairs of adjacent secondaries form one portion or side of balanced bridges that are each completed by two serially connected resistors disposed between the two outer nodes of each selected pair of secondaries. In all, three such bridge circuits are formed. Each bridge circuit also includes a differential amplifier which has a first input connected to the common node between the selected pair of secondaries, and the other input connected to the common node between the two resistors completing that bridge. The output of each differential amplifier of a bridge circuit drives the common node between the two other bridge circuits. Each differential amplifier provides a high input impedance, a low output impedance, and a gain of two. Due to the combination of the balanced symmetry of the circuitry and the characteristics of the differential amplifiers, a signal appearing at any port is also impressed across the other port of the same bridge and coupled to the other four ports of the two other bridges through the differential amplifier of the bridge circuit from which the signal originated, thereby permitting conference calls between all six ports.

BRIEF DESCRIPTION OF THE DRAWING

The sole FIGURE is a schematic diagram of a six-port conference amplifier in accordance with the invention.

DETAILED DESCRIPTION

Turning now to the drawing, each of the designated ports in the FIGURE may be a termination point for a subscriber's (i.e., conferee's) telephone line. Ports 1 through 6 each comprise a terminal pair connected to a primary circuit of one of the respective coupling networks, or transformers, 11 through 16. The secondary circuits of transformers 11 through 16 are serially connected in a hexagonal ring. It is apparent from the FIGURE that the secondary circuits of adjacent pairs of transformers, such as transformers 11 and 16, are also connected as two arms of a bridge circuit. The first bridge circuit, which includes transformers 11 and 16, is completed by serial resistors 19 and 21. Nodes 17 and 18 are located at the "end" points of this bridge circuit. A second bridge circuit comprises the secondary circuits of transformers 12 and 13 and serial resistors 22 and 23. The node 18 is the common connection between the first and second bridge circuits. The secondary circuits of transformers 14 and 15 along with serial resistors 26 and 27 comprise a third bridge circuit. Node 24 is common to the second and third bridge circuits, while node 17 is common to the first and third bridge circuits. Each bridge circuit also includes a differential amplifier. The differential inputs of amplifiers 28, 29 and 31 are connected respectively to the first, second and third bridge circuits. It should be noted that all the amplifiers in the FIGURE are essentially identical. Furthermore, each of the amplifiers is selected to have a high input impedance, a low output impedance, and a voltage gain of two. Each amplifier has two differential inputs that are connected to the balancing nodes of their respective bridge circuits (e.g., amplifier 28 is connected to nodes 32 and 33 of the first bridge). To achieve the desired performance, the input terminals of each amplifier should be connected to the respective bridge circuit observing the same polarity. For example, the inverting input terminal of each amplifier is always shown connected to the resistance arm of each bridge circuit. The output of each amplifier is coupled to the common node between the other two bridge circuits in the hexagonal ring.

Before discussing circuit operation, typical component characteristics and values will be presented. As the nominal impedance of a telephone line is most typically 600Ω, this value should be the basis for the selection of the component characteristics and values of the conference amplifier. Of course, those working in the art may select other values than those given herein in utilizing the invention. In this particular example, transformers 11 through 16 are all the same electrically and each has a turns ratio between the primary and secondary windings in the neighborhood of one. All of the resistors in the FIGURE have a nominal resistance of approximately 600Ω, which serves to maintain balanced symmetry among the three bridge circuits of the conference amplifier. The type of differential amplifiers selected for amplifiers 28, 29 and 31 should have high input impedance. A typical high input impedance, in this case, is approximately 15 kΩ. Furthermore, the output impedance of these amplifiers should be low (e.g., about 10Ω). Finally, each amplifier should have a differential gain of about 6 dB and a common mode gain as low as practicable. A variety of suitable integrated circuit differential amplifiers for the purposes of this invention are commercially available from many different manufacturers of integrated circuits.

The operation of the embodiment of the invention in establishing conference calls will now be described. For purposes of explanation, assume a signal originating at port 1 or 6 and all other ports passive. Considering the first bridge circuit disposed between nodes 17 and 18, which are respectively connected to the outputs of amplifiers 29 and 31, any signal originating in port 1 or 6 will create a corresponding voltage potential across the secondary circuit of that port. Since nodes 17 and 18 are essentially at ground potential because the second and third bridge circuits are balanced, the low impedance outputs of amplifiers 29 and 31 serve to couple nodes 17 and 18 together by providing a low impedance signal path to ground. Accordingly, a signal originating from either port 1 or 6 also appears at the other port via the interconnection of the secondary circuits of transformers 11 and 16. At the same time, the originating signal produces a voltage differential between nodes 32 and 33 which drives amplifier 28. It should be noted that because nodes 17 and 18 are held at ground potential, no voltage potential appears at node 33. The output of amplifier 28, in turn, is applied to node 24 which is common to the second and third bridge circuits.

Due to the balanced symmetry of the second and third bridge circuits, the output signal of amplifier 28 produces equal potential drops across the arms of the respective bridge circuits. Thus, no potential difference is created for the inputs of amplifiers 29 and 31 and their outputs continue to remain at ground potential. Furthermore, the voltage potential applied to node 24 divides equally between the series connected secondary circuits in the respective bridges. That is, the potential drop across each of the secondary circuits of transformers 12 and 13 is equal and half the potential value applied to node 24. Similarly, the same potential division occurs across the secondary circuits of transformers 14 and 15 in the third bridge. With an amplification factor of two in amplifier 28 acting on the originating signal, a signal of the same level as the originating signal is thus available at the other output ports after the signal division. It is therefore apparent that any signal originating at port 1 or 6 creates a potential difference between nodes 32 and 33 which is amplified and applied to node 24 for the other two bridge circuits.

The foregoing description of the operation of the conference amplifier for signals originating at the first bridge circuit can be extended, by application of the superposition principle utilized in circuit analysis, to signals originating simultaneously in any combination of ports. Since the signals originating in each bridge circuit are from independent sources and the conference amplifier is a linearly operated network, the total operation of the conference amplifier may be analyzed by summing the response to each individual signal source with all other signal sources made inoperative (i.e., reduced to zero voltage while retaining the internal impedance). Accordingly, use of the additivity property of the superposition principle can be utilized to extend the foregoing analysis of the circuit operation to include all the bridge circuits of the conference amplifier. Thus, any call originating in the second bridge circuit at port 2 or 3 is amplified by amplifier 29 and applied to node 17. This signal is thus coupled to the other two bridge circuits of the amplifier. Likewise, signals originating at port 4 or 5 are coupled to each other and also applied to node 18 via amplifier 31 thereby coupling these signals to the first and second bridge circuits. The operation of all three amplifiers, which involves detecting the signals originating at their respective bridge circuits and coupling an amplified version thereof to the other bridge circuits, enables conference calls among all six ports of the conference amplifier.

It should be noted that the conference amplifier may be readily adapted for use with composite signaling set arrangements, which are conventional circuits in the telephone art, by replacing the coupling transformers therein with such arrangements. This substitution conveniently provides a method of powering the subscriber line connected to the conference amplifier and of bypassing same for supervision signaling purposes. Accordingly, it is to be understood that the arrangements disclosed in the foregoing description are merely illustrative of the application of the principles of the present invention. Numerous and varied other arrangements may be utilized by those skilled in the art without departing from the spirit and scope of the invention.

I claim:

1. A telephone conference amplifier circuit comprising six coupling means each one of which is associated with an external port, all of said coupling means internally connected in a hexagonal ring, three pairs of substantially equal value resistors, each said pair being respectively connected to the coupling means of adjacent pairs of ports to form three balanced bridge circuits, a differential amplifier means connected to each bridge circuit for detecting and amplifying signals originating in that bridge, and means for coupling the output of each amplifier means to the common point between the other two bridges, thus coupling a signal from one port into the other ports of the amplifier.

2. A telephone conference amplifier circuit according to claim 1 wherein each of said coupling means is a transformer device having a primary winding connected to one of said external ports and a secondary winding serially connected in said hexagonal ring.

3. A telephone conference amplifier circuit comprising a plurality of coupling networks each having primary and secondary circuits, each of said primary circuits associated with a port, said secondary circuits all being connected in a series circuit such that a hexagonal ring is formed by said secondary circuits; and a plurality of resistive means each having first, second and third terminals, said first terminal connected to one of the outer terminals of a pair of adjacent secondary circuits and said third terminal connected to the other outer terminal of said pair of adjacent secondary circuits such that three bridge circuits are formed each comprising an adjacent pair of secondary circuits and one of said resistive means; and each of said bridge circuits further including amplifying means having two input terminals and a single output terminal, one of the input terminals of said amplifying means connected to the common node connecting the inner terminals of the adjacent pair of secondary circuits in that bridge circuit and the other input terminal of said amplifying means connected to the second terminal of the resistive means having first and third terminals connected to the outer terminals of the adjacent pair of secondary circuits in the same bridge circuit, and the output terminal of said amplifying means connected to the common node connecting the other two bridge circuits such that each primary circuit is coupled to all the other primary circuits.

4. A telephone conference amplifier circuit according to claim 3 wherein each of said coupling networks is a transformer device.

5. A telephone conference amplifier circuit according to claim 4 wherein each of said amplifying means is a differential amplifier and the one of said input terminals is a noninverting input while the other of said input terminals is an inverting input in relation to the phase of the output of each differential amplifier.

6. A telephone conference amplifier circuit according to claim 5 wherein each of said differential amplifiers has a high input impedance, a low output impedanace, and a gain of two.

* * * * *